Figure 1:
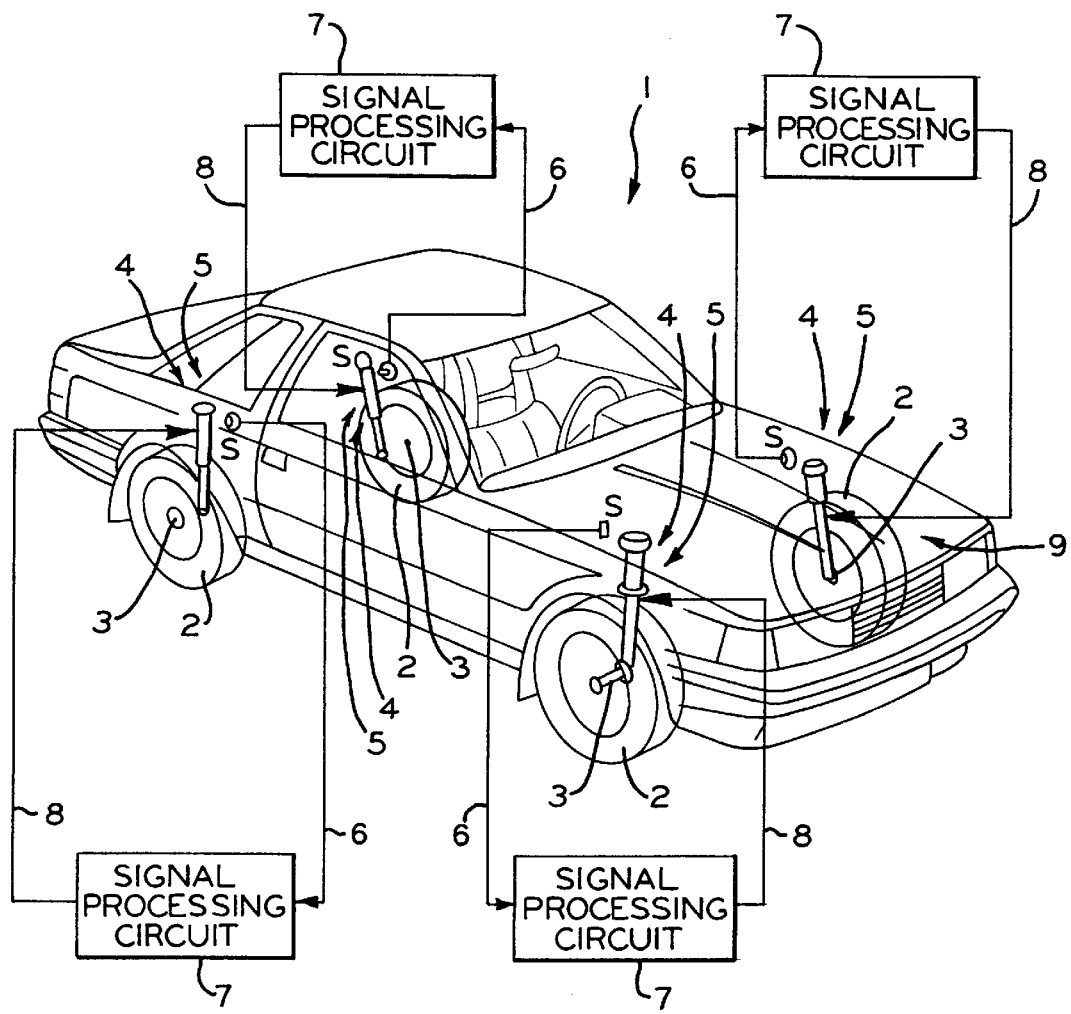

United States Patent
Neumann et al.

[11] Patent Number: 5,931,879
[45] Date of Patent: *Aug. 3, 1999

[54] METHOD AND DEVICE FOR DAMPING OF MOTION SEQUENCES OF TWO BODIES

[75] Inventors: Udo Neumann, Leonberg; Rainer Kallenbach, Stuttgart, both of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/114,293

[22] Filed: Aug. 30, 1993

Related U.S. Application Data

[63] Continuation of application No. 07/646,611, filed as application No. PCT/DE90/00347, May 14, 1990, abandoned.

[30] Foreign Application Priority Data

Jun. 8, 1989 [DE] Germany .............................. 39 18 735

[51] Int. Cl.$^6$ ..................................................... B60G 17/00
[52] U.S. Cl. .............................................. 701/37; 280/5.5
[58] Field of Search ............................. 364/424.05, 434; 280/707, 840

[56] References Cited

U.S. PATENT DOCUMENTS

| | | |
|---|---|---|
| 4,567,564 | 1/1986 | Bittner et al. ............................. 364/434 |
| 4,696,489 | 9/1987 | Fujishiro et al. ......................... 280/707 |
| 4,700,971 | 10/1987 | Doi et al. ................................. 280/707 |
| 4,866,291 | 9/1989 | Okamoto .................................. 280/707 |
| 4,903,209 | 2/1990 | Kaneko ............................... 364/424.05 |
| 4,907,154 | 3/1990 | Yasuda et al. ...................... 364/424.05 |
| 4,921,272 | 5/1990 | Ivers ....................................... 280/707 |
| 4,936,423 | 6/1990 | Karnopp ................................. 188/299 |
| 4,953,089 | 8/1990 | Wolfe ................................. 364/424.05 |
| 4,984,820 | 1/1991 | Uchiyama et al. ..................... 280/707 |
| 4,989,148 | 1/1991 | Gürke et al. ........................ 364/424.05 |
| 5,004,079 | 4/1991 | Ivers et al. .............................. 188/282 |
| 5,020,781 | 6/1991 | Huang .................................. 280/707 X |
| 5,034,890 | 7/1991 | Sugasawa et al. ................. 364/424.05 |

FOREIGN PATENT DOCUMENTS 3738048 11/1987 Germany .

Primary Examiner—William A. Cuchlinski, Jr.
Assistant Examiner—Ed Pipala
Attorney, Agent, or Firm—Baker & Daniels

[57] ABSTRACT

A device for damping the motion sequences of two masses includes sensors for detecting relative motion between the two masses and absolute motion of one of the two masses. A signal processing circuit receiving output signals from the sensors has an output which is dependent on the frequency of the sensed signals. A controllable actuator receives the signal processing circuit output and is connected to the two masses.

23 Claims, 4 Drawing Sheets

METHOD AND DEVICE FOR DAMPING OF MOTION SEQUENCES OF TWO BODIES

This is a continuation of application Ser. No. 07/646,611, filed Jan. 24, 1991, now abandoned and PCT/DE90/00747, filed May 14, 1990.

STATE OF THE ART

The invention concerns a method of the damping motion sequences, particularly in running gear of passenger and utility motor vehicles, in the nature of the Main Claim.

In motor vehicle technology the aim is to achieve as high a possible ride comfort at the same time as safe disposition of the running gear even at the limits of the driving conditions. Ride comfort and driving safety are opposed to each other to the extent that a comfortable adjustment of the running gear under extreme driving conditions does not offer a sufficient driving safety; on the other hand a hard and rigid adjustment of the running gear does not meet high requirements of ride comfort. The aim is for the dynamic fluctuation of the wheel load to be as small as possible when the body acceleration is small (in the course of this Application by body or vehicle body is to be understood i.a. the passenger cell). A soft damper leads to low body acceleration; but to large dynamic wheel load fluctuation. A hard damper on the other hand brings about high body acceleration, i.e. less ride comfort, but reduces the dynamic wheel load fluctuation.

Various systems of spring mounting and damping between wheel and body of a vehicle are known. As a rule all systems have in common a spring arrangement to which a damping device is coupled in parallel. In the case of passive systems the damping device has a shock absorber of conventional type, i.e. piston-cylinder arrangement is used where the piston can be moved while overcoming the flow resistance of a medium. A constant flow passage is available for the medium. In the case of so-called semiactive systems there is an arrangement of appropriate design where however the cross-section of the flow can be controlled so that the damping properties can be varied. Finally, the active systems are also known, in the case of which a piston of the damper or actuator divides a cylinder into two operating chambers into which a medium is introduced by an appropriate control. The active system thus requires energy for the build-up of pressure for the pressure medium. If the damping force is plotted against the velocity of the damping piston in a coordinate system, then in the case of the passive and semiactive systems the characteristic curves lie in the first and third quadrant, while in the case of active systems characteristic curves can also be realized in the second and fourth quadrant.

In the above mentioned known method of damping the motion sequences the state of motion existing at any given time is detected sensorially in a motor vehicle. The sensor signals are transmitted to a signal processing circuit which produces the control signal for an actuator, preferably a semiactive damper. This damper is placed in parallel to a spring arrangement between the axle of the vehicle and the vehicle body. Altogether in this manner a control of the running gear is effected which attunes the degree of damping by the damper in dependence on the state of motion. A comfort adjustment can consequently be established in non-critical driving conditions and an adjustment conductive to safety established in critical driving conditions. The object is to improve this known damping method.

Advantages of the Invention

The method in accordance with the invention having the characteristics mentioned in the Main Claim has on the other hand the advantage that because of the frequency-dependant processing of the sensor signals there results no static characteristic curve of the signal processing circuit, but that this characteristic curve varies with the frequency. From this results an actuator control or regulation dependent on the frequency content of the motion sequence. In a vehicle a mass is constituted preferably by a wheel and another mass by the vehicle body. Preferably at least one filter is used for this purpose as a circuit arrangement. The signals passing through the filter are influenced in their amplitude and/or phase behaviour. Due to this influence there results such an attunement to the state of motion at any given time that a running gear adjustment conductive to driving safety is set in critical driving conditions and a comfortable running gear adjustment in non-critical conditions.

If control of an individual wheel is effected in a vehicle having several wheels, the determination of the vehicle mass appertaining to each wheel must be based on the part of the vehicle mass in the vicinity of the wheel attachment of the appropriate wheel.

Of the great possible number of dynamic vehicle state variables to be determined by sensors it is particularly advantageous to detect the body acceleration and axle acceleration of the axle on which the wheel is situated or the body acceleration and the spring displacement deflection of the vehicle body relative to the axle or the body acceleration and the rate of spring displacement or the axle acceleration and the spring displacement deflection or the axle acceleration and the rate of spring displacement. By appropriate (electronic) analog or digitally effected reformation of the signals transmitted by the sensors by known signal processing methods (addition, subtraction, integration, differentiation) the signals necessary for a preferred concept of regulation may be produced. These are the absolute body velocity and the relative rate of spring displacement. The detection of the absolute body velocity has the advantage that by means of the method in accordance with the invention an abatement of the body motions can be effected without the loss of comfort, which in conventional running gear could only be achieved by hard, i.e. comfort-diminishing damping.

The absolute body velocity relates to an inertial coordinate system; by the rate of spring displacement is to be understood the velocity of the vehicle body relative to the wheel.

In accordance with a preferred embodiment of the invention two filters are provided to one of which are transmitted the signals corresponding to the body velocity and to the other those corresponding to the rate of spring displacement and the output signals of which are used to produce the control signal for the actuator. Thereby frequency-dependent "skyhook damping" can be effected by means of one filter and frequency-dependent "passive damping" by means of the other filter. The input value of the skyhook damping is based on body velocity and that of the passive damping on the rate of spring displacement. Skyhook damping and passive damping will be described in detail in the description of the figures.

The transfer functions of the filters are preferably described by the equations $$F_1(s) = \frac{\sum_{i=0}^{m_1} bi_1 s^i}{\sum_{i=0}^{n_1} ai_1 s^i}, F_2(s) = \frac{\sum_{i=0}^{m_2} bi_2 s^i}{\sum_{i=0}^{n_2} ai_2 s^i}$$

In principle the coefficients of the transfer functions of the filters are determined in such a manner, for example by mathematical optimal systems, so as to result in a behaviour of the vehicle which is as good as possible with regard to ride comfort and driving safety. In addition it is further possible to attune the coefficients flexibly to the instantaneous driving condition and/or to the requirements of the driver. This ensues by means of sensors detecting the driving condition and/or by prior setting. The filters may be digital or analog.

It is of advantage to use filters of different orders. It is preferable to use a filter of zero order for the processing of the signals appertaining to the body velocity and a filter of the second order for the signals appertaining to the rate of spring displacement.

In addition to the possibility already mentioned of using semiactive dampers, actuators corresponding to an active system can also be employed.

The invention further concerns a device for damping motion sequences, particularly in the running gear of passenger and utility motor vehicles, with sensors detecting the dynamic state of the motion sequence of two masses, the signals of which sensors are transmitted to a signal processing circuit whose output is connected to a controllable actuator attached to the masses, the signal processing cicuit having a circuit arrangement with frequency-dependent dynamic system behaviour.

As already mentioned, the circuit arrangement consists of two filters which influence the ampitude and/or the phase behaviour and whose outputs are connected to a summation point for the purpose of providing a control signal for the actuator.

Insofar as the device is used for the control of running gear of motor vehicles, one mass consists of the mass of the wheel and the other by the part of the mass of the vehicle body which appertains to the wheel.

A preferred embodiment consists of the wheel and the vehicle body having one sensor appertaining to each. The wheel is located on an axle which is connected to the vehicle body by a spring arrangement. Parallel to the spring is situated the actuator (particularly damper). Insofar as the vehicle has several wheels, preferably four, it is preferable that a damping device constituted in accordance with the invention appertains to each wheel.

DRAWING

Figure 2:
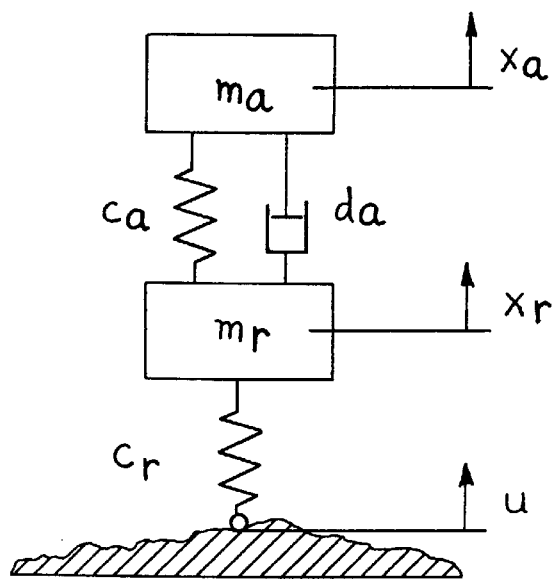
Figure 3:
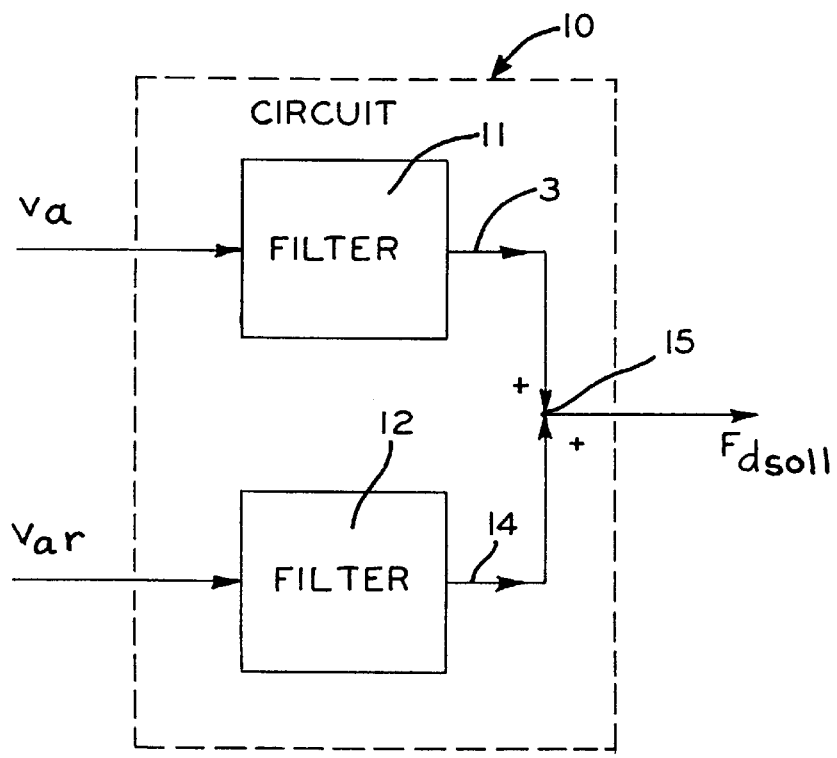
Figure 4:
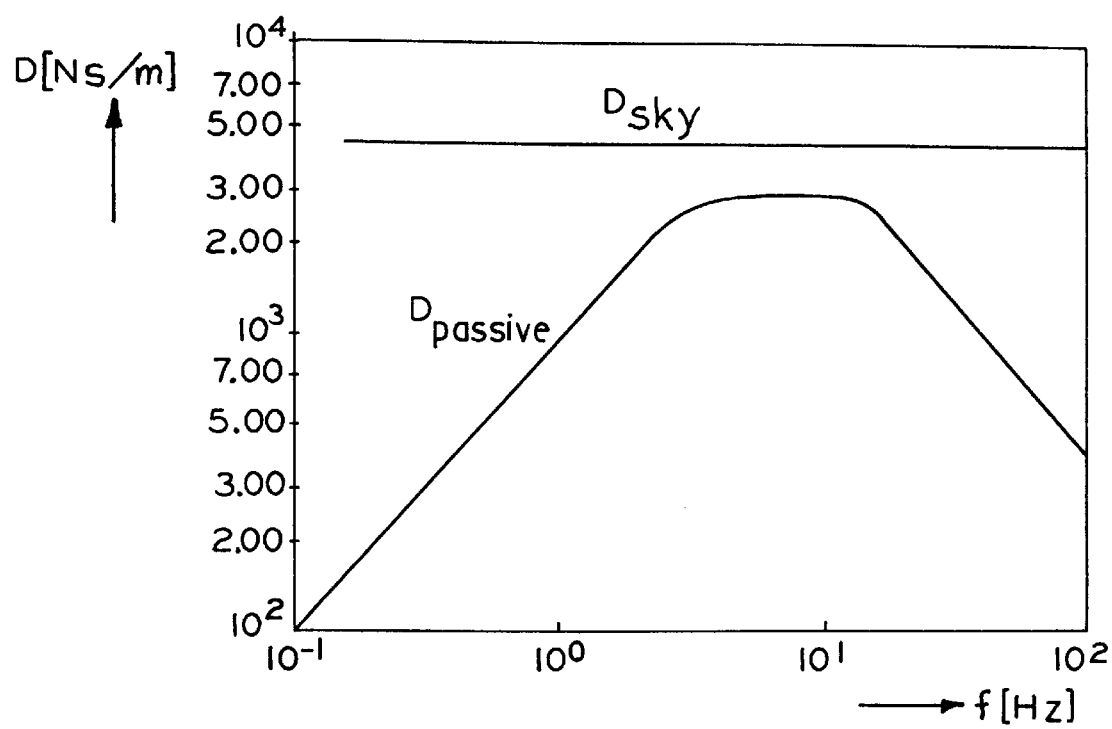
Figure 5:
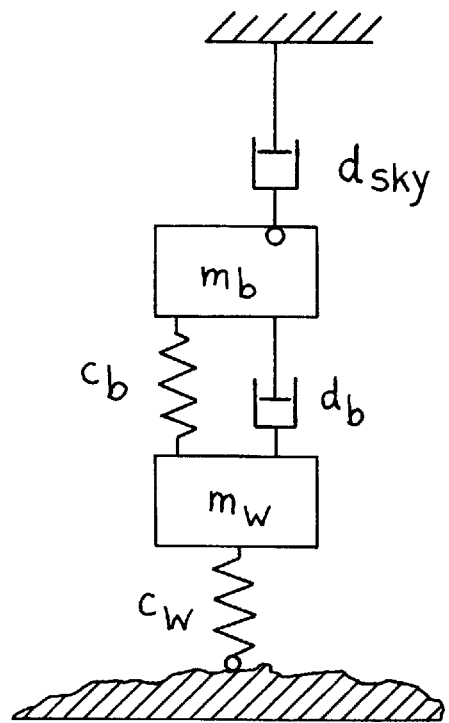
Figure 6:
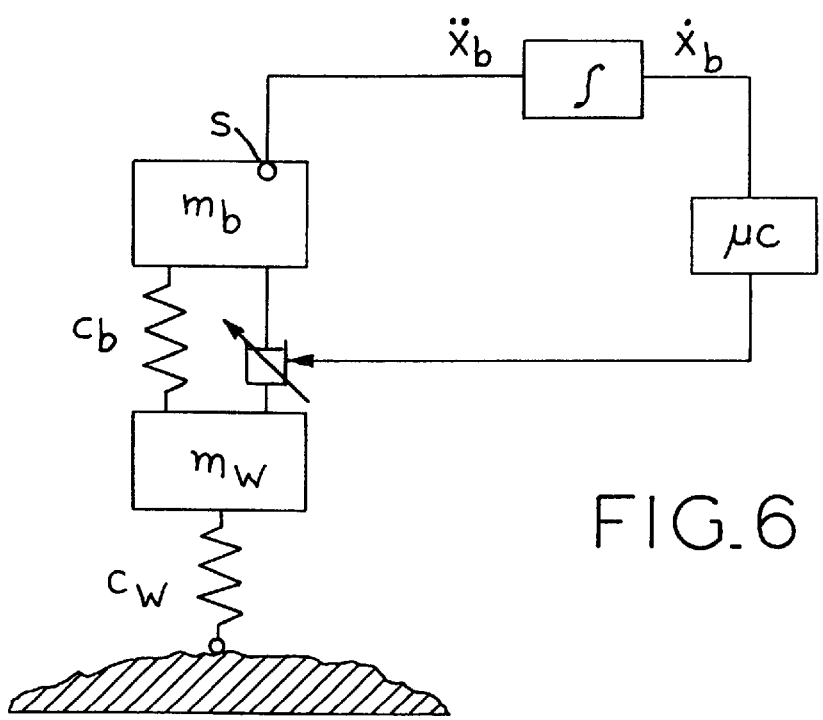

The invention is described below in greater detail by means of the figures. They show:

FIG. 1 a vehicle equipped with a running gear control working in conformity with the method in accordance with the invention, FIG. 2 a representation in the form of a model of a wheel region of the vehicle with regard to the construction of the springs and the damping, FIG. 3 a block diagram of a signal processing circuit, FIG. 4 a diagram of the amplitude response of the damping arrangement, FIG. 5 a representation in the form of a model of a wheel region with skyhook components and FIG. 6 a representation of an embodiment of the skyhook components.

DESCRIPTION OF ONE EMBODIMENT OF THE INVENTION

FIG. 1 shows a motor vehicle 1 with wheels 2 which are arranged on an axle 3. Appertaining to each axle 3 is a spring arrangement 4 not shown in more detail and a damper 5. In each case a sensor device S is further schematically represented which is connected to a signal processing circuit 7 by way of a connection 6, which signal processing circuit 7 delivers at its output 8 a control signal for an actuator which appertains to each individual wheel. The actuator is constructed as a semiactive damper 5, i.e. the flow resistance and consequently the damping behaviour may be changed by varying of the flow cross-section.

FIG. 1 accordingly shows a single-wheel control, since a control unit of a preferably electronically operating control system with the sensors (sensor device S) belonging thereto and the regulator system (damper 5) belonging thereto appertains to each wheel. The signal and information processing of the control units appertaining to each wheel ensues preferably independently of each other—notwithstanding possible common electronic or electromechanical hardware components.

In view of the presupposed independence, the deriviation of the law of control can ensue below by way of a two-mass model for the vertical dynamic of the vehicle 1. The two-mass system represented in FIG. 2 shows schematically the wheel 2 and the vehicle body 9 in the vicinity of the wheel attachment belonging thereto. The model comprises schematically the individual vehicle components as follows:

the unsprung vehicle masses (wheel rim, movable axle and wheel steering parts) in the wheel mass $m_w$, the vertical resilience of the elastic wheel elements in the form of the spring constant $c_w$, the sprung vehicle masses (mass of the part of the body situated in the vicinity of the wheel attachment) in the body mass $m_b$, the spring suspension to isolate the vehicle body 9 oscilatorily and to take the static body weight, in the form of spring constant $c_b$ and the actuator constituted as an active or semiactive actuator and which forms the damper 5 with its damping value $d_b$.

Three coordinate systems are further represented in FIG. 2. These refer to the unevenness u of the road surface on which the wheels 2 run, the vertical deflection displacement $x_w$ of the wheel mass $m_w$ and the vertical deflection $x_b$ of the body mass $m_b$.

Each sensor device S has two sensors. These detect—alternatively in accordance with the combinations listed— the body acceleration and the axle acceleration or the body acceleration and the spring displacement deflection or the body acceleration and the rate of spring displacement or the axle acceleration and the spring displacement deflection or the axle acceleration and the rate of spring displacement.

The absolute body velocity $v_b$ (in relation to an inertial system) and the relative rate of spring displacement $v_{bw}$ between the vehicle body 9 and the wheel 2 are obtained by electronic processing in the individual signal processing circuit, of the signals transmitted by the individual sensors.

In accordance with FIG. 3, the signal processing circuit 7 has a circuit arrangement 10 with two filters 11 and 12. The body velocity $v_b$ is transmitted as an input to the filter 11 and the relative rate of spring displacement $v_{bw}$ as an input to the filter 12. The outputs 13 and 14 of the filters 11 and 12 are connected to an accumulation point 15 for the purpose of producing an actuator reference power signal $F_{dref}$. Active power regulators, semiactive power regulators, power adjusted throttle regulators or power controlled throttle regulators may be used as actuators.

The two filters 11 and 12 represented in FIG. 3 are described by the course of their amplitude and the course of their phase in dependence on the frequency of the signals transmitted to them. The filters 11 and 12 can be realized electronically digitally, for example by processing by means of a computing program of an electronic control device a time-discrete differential equation representing the filter transfer properties, or electronically analog, for example by simulation of a time-continuous differential equation representing the filter transfer properties and having electronic elements.

By the use of the filters 11 and 12 the actuator reference power signal $F_{dref}$ may be described mathematically as follows:

$$F_{dref} = F_1\{v_b\} + F_2\{v_{bw}\}$$

Herein $F_1$ and $F_2$ are the filter operators applied to the transmitted signals (absolute body velocity $v_b$; relative rate of spring displacement $v_{bw}$). The filter operators may be described in the frequency range by their transfer functions.

$$F_1(s) = \frac{\sum_{i=0}^{m_1} bi_1 s^i}{\sum_{i=0}^{n_1} ai_1 s^i}, F_2(s) = \frac{\sum_{i=0}^{m_2} bi_2 s^i}{\sum_{i=0}^{n_2} ai_2 s^i}$$

If the actuator reference power signal is transmitted to an approximately ideal actuator, then $F_d \approx F_{dref}$, where $F_d$ is the damping force. The damping force $F_d$ can consequently be split up on the basis of the method in accordance with the invention into frequency-dependent skyhook damping $D_{sky}$(f) attributable to the body velocity $v_b$, and frequency-dependent passive damping $D_{passive}$(f) attributable to the rate of spring displacement $v_{bw}$. By skyhook damping $D_{sky}$ to be understood an inertial damper attached to the body mass $m_b$ connected to an inertial fixed point (the sky) (comp. FIG. 5). Such an inertial damper cannot in practice be readily realized; it must therefore be comprised in the damping value $d_b$.

FIG. 5 shows the structure of the described system and FIG. 6 shows the embodiment. This ensues from the body acceleration $\ddot{x}_b$ of the vehicle body 9 being detected by means of a sensor of the sensor device S and being integrated for the purpose of producing the body velocity $x_b$ and transmitted to a microprocessor which controls the actuator constituted in the form of a semiactive damper 5. Hereto applies the frequency-dependent skyhook damping $D_{sky}$(f) and the frequency-dependent passive damping $D_{passive}$(f) already mentioned.

The properties of the filters 11 and 12 used are determined by mathematical optimal systems or similarly in such a manner that the resulting behaviour of the vehicle 1 is as good as possible with regard to ride comfort and driving safety.

In accordance with a further development of the invention it is also possible to adjust the filter coefficients and consequently the behaviour of the vehicle flexibly to the instantaneous driving conditions or to the requirements of the driver.

The behaviour of the amplitude as well as the behaviour of the phase of the filters 11 and 12 used determine the behaviour of the adjustment of the running gear of vehicle 1. In particular the orders of the filters 11 and 12 used and—as already described—the filter coefficients must be determined.

An especially simple lay-out will be explained by means of an example. The filter 11 in the skyhook branch is constituted in the form of a transfer member (filter of zero order), which corresponds to a constant skyhook damping $D_{sky}$. In this case there is therefore no frequency dependence. The filter 12 in the passive branch is realized in the form of a filter of the second order with a transfer function $$G_2(s) = \frac{b_o + b_1 s + b_2 s^2}{a_o + a_1 s + s^2}$$

An optimization of the filter coefficients which can, for example, be stored in look-up tables or performance characteristics or be computed in real-time in the microprocessor, then yields for example the curve of the skyhook or passive damping dependent on the frequency f.

Even with this simple lay-out, vehicle behaviour can be achieved which is distinctly superior with regard to ride comfort and driving safety to conventional vehicles equipped with passive running gear elements, whereby the gain in comfort is attributable to the effect of the inertially damping skyhook component and the low passive damping within the comfort range (1 to 8 Hz). At the same time there results a very high degree of driving safety which is superior to that of conventional vehicles, and which is attributable to the rise descernible in FIG. 4 of passive damping in the range of the individual wheel frequency (approx. 8 to 15 Hz).

We claim:

1. A method for damping the motion sequences of two masses, comprising the steps of:

sensing relative motion between said two masses and absolute motion of one of said two masses;

providing first and second sensed signals respectively corresponding to said sensed relative and absolute motions;

generating a control signal with a signal processing circuit and outputting said control signal to a controllable actuator which engages said two masses, said signal processing circuit having a transfer function which is dependent on at least respective ones of said first and second sensed signals;

filtering said first sensed signal in a first signal branch of said signal processing circuit, dependent on at least respective ones of said sensed signals representing said relative motions; and processing said second sensed signal in a second signal branch of said signal processing circuit.

2. A method in accordance with claim 1, wherein said signal processing circuit comprises at least one filter regulating at least one of the amplitude and phase of said control signal.

3. A method in accordance with claim 1, wherein one mass comprises a wheel and the other mass comprises a vehicle body.

4. A method in accordance with claim 3, wherein said body mass of the vehicle comprises a portion of the body mass located in the vicinity of the corresponding wheel.

5. A method in accordance with claim 3, wherein said sensing step comprises sensing one of body acceleration and axle acceleration of an axle to which the corresponding wheel appertains, body acceleration and spring displacement of the vehicle body relative to the axle, body acceleration and rate of spring displacement, the axle acceleration and the spring displacement, and the axle acceleration and rate of spring displacement.

6. A method in accordance with claim 5, wherein an absolute body velocity and a relative rate of spring displacement are generated from the sensed signals.

7. A method in accordance with claim 6, wherein said signal processing circuit comprises a first filter and a second filter, said first filter receiving sensed signals corresponding to the vehicle body velocity and said second filter receiving sensed signals corresponding to the relative rate of spring displacement said first and second filters providing respective output signals which are summed-up to produce the control signal.

8. A method in accordance with claim 7, wherein said first and second filters comprise transfer functions described by the equations:

$$F_1(s) = \frac{\sum_{i=0}^{m_1} bi_1 s^i}{\sum_{i=0}^{n_1} ai_1 s^i},$$

$$F_2(s) = \frac{\sum_{i=0}^{m_2} bi_2 s^i}{\sum_{i=0}^{n_2} ai_2 s^i}$$

where:
$ai_1$, $ai_2$, $bi_1$ and $bi_2$ represent filter parameters which are adapted to a specific vehicle;
s is the Laplace transform variable; and
$m_1$, $m_2$, $n_1$ and $n_2$ represent the highest power of the Laplace variable.

9. A method in accordance with claim 8, wherein said transfer functions include coefficients which are adjusted to at least one of an instantaneous driving condition and to the requirements of a driver.

10. A method in accordance with claim 7 wherein said first and second filters comprise filters of different orders.

11. A method in accordance with claim 7, wherein one of said first and second filters comprises a filter of zero order used to process the sensed signals corresponding to the body velocity, and the other of said first and second filters comprises a filter of second order used to process the sensed signals corresponding to the rate of spring displacement.

12. A method in accordance with claim 1, wherein said actuator comprises one of an active and semiactive damper.

13. A device for damping the motion sequences of two masses, comprising:
a plurality of sensors for detecting relative motion between said two masses and absolute motion of one of said two masses, said sensors providing output signals;
a signal processing circuit for receiving said sensor output signals and providing an output dependent on said sensor output signals, said signal processing circuit including a means for filtering at least said sensor output signals representing said relative motion, dependent on frequencies of at least respective ones of said sensor output signals representing said relative motion; and
a controllable actuator for receiving said signal processing circuit output and connected to said two masses.

14. A device in accordance with claim 13, wherein said signal processing circuit comprises a first and second filter for influencing the amplitude and phase of said sensed signals, each of said filters having an output which is connected to a summation point, said summation point connected to and providing a control signal to said actuator.

15. A device in accordance with claim 13, wherein said two masses comprise a wheel and a portion of a body of a vehicle corresponding to the wheel.

16. A device in accordance with claim 15, wherein the wheel and the corresponding portion of the vehicle body each have a sensor appertaining to it.

17. A device in accordance with claim 16, wherein the wheel includes an axle which is connected to the vehicle body by a spring arrangement.

18. A device in accordance with claim 15, wherein the vehicle has a plurality of wheels and a controllable actuator corresponding to each wheel.

19. A device in accordance with claim 14, wherein said two masses comprise a wheel and a portion of a body of a vehicle corresponding to the wheel.

20. A process for damping motion sequences of two masses, comprising the steps of:
sensing the motion sequences and providing signals corresponding thereto, said motion sequences comprising relative movements of the two masses and absolute movements of one of the two masses; and
generating control signals for a controllable actuator attached to the masses by filtering at least said sensed signals representing said relative movements, using frequencies of at least respective ones of said sensed signals representing said relative movement;
said control signals generated by at least one of signals corresponding to an additive superimposition of said relative and absolute movements, and said filtered signals.

21. The device of claim 13, wherein said signal processing circuit additively superimposes said sensor output signals representing said relative motion and said sensor output signals representing said absolute motion.

22. The device of claim 13, wherein said signal processing circuit uses a transfer function which is dependent on respective frequencies of said sensor output signals representing said relative motion and said sensor output signals representing said absolute motion.

23. The method of claim 1, comprising the further step of additively superimposing said first and second sensed signals.

* * * * *